United States Patent
Zhang et al.

(10) Patent No.: US 8,036,173 B2
(45) Date of Patent: Oct. 11, 2011

(54) SYSTEM AND METHOD FOR MANAGING WIRELESS BASE STATION HANDOFF INFORMATION

(75) Inventors: Cheng Zhang, Shanghai (CN); Heng Pan, Shanghai (CN); Yanjun Yin, Shanghai (CN)

(73) Assignee: Adaptix, Inc., Carrollton, TX (US)

( * ) Notice: Subject to any disclaimer, the term of this patent is extended or adjusted under 35 U.S.C. 154(b) by 778 days.

(21) Appl. No.: 11/651,307

(22) Filed: Jan. 9, 2007

(65) Prior Publication Data
US 2008/0137610 A1    Jun. 12, 2008

(30) Foreign Application Priority Data
Dec. 8, 2006   (CN) .......................... 2006 1 0162236

(51) Int. Cl.
*H04Q 1/00* (2006.01)
(52) U.S. Cl. ......... 370/331; 370/329; 455/436; 455/438
(58) Field of Classification Search .................. 370/331, 370/328, 329, 336, 342; 455/436, 428, 432.3, 455/433, 435, 435.1, 442, 445, 552.1, 414.1, 455/434, 411, 438, 439
See application file for complete search history.

(56) References Cited

U.S. PATENT DOCUMENTS

| | | | |
|---|---|---|---|
| 5,678,184 A * | 10/1997 | Cutler et al. | 455/436 |
| 6,834,192 B1 * | 12/2004 | Watanabe et al. | 455/444 |
| 2004/0185780 A1 * | 9/2004 | Coupechoux et al. | 455/62 |
| 2005/0163080 A1 * | 7/2005 | Suh et al. | 370/331 |
| 2006/0185012 A1 | 8/2006 | Olivereau et al. | |
| 2006/0223538 A1 * | 10/2006 | Haseba et al. | 455/436 |
| 2006/0251022 A1 * | 11/2006 | Zhang et al. | 370/331 |
| 2007/0037576 A1 * | 2/2007 | Subramanian et al. | 455/436 |
| 2007/0086388 A1 * | 4/2007 | Kang et al. | 370/331 |

OTHER PUBLICATIONS

International Search Report and Written Opinion issued for PCT/US2007/086241; Dated: Apr. 10, 2008; 10 Pages.

* cited by examiner

*Primary Examiner* — Jean Gelin
(74) *Attorney, Agent, or Firm* — Fulbright & Jaworski L.L.P.

(57) ABSTRACT

The present invention is directed to a system and method which base stations send informational messages to neighbor base stations when conditions change, so that the neighbor base stations can update its database to keep itself current on the parameters (including availability, traffic load, modulation scheme, etc.) to use in effecting efficient base station to base station handoffs. In one embodiment, the receiving base station marks the time of the received message from a neighbor base station and if a new updated message is not received within a time window then the receiving base station assumes that there is a problem with that neighbor.

20 Claims, 4 Drawing Sheets

SYSTEM AND METHOD FOR MANAGING WIRELESS BASE STATION HANDOFF INFORMATION

RELATED APPLICATIONS

This application is related to and claims priority to Chinese Application No. 200610162236.0 filed Dec. 8, 2006 entitled "SYSTEM AND METHOD FOR MANAGING WIRELESS BASE STATION HANDOFF INFORMATION", the disclosure of which is hereby incorporated herein by reference.

TECHNICAL FIELD

This invention relates to cellular base station information management and more particularly to systems and methods for managing base station handoff information.

BACKGROUND OF THE INVENTION

Mobile communication systems rely on handoffs between base stations to accommodate movement of the wireless station (user) into and out of transmission range. It is, of course, desired that these handoffs be accomplished as smoothly as possible and standards exist to accomplish the handoff task in an orderly manner.

However, the effectiveness of the handoff is controlled in large measure on the knowledge of a base station with respect to the surrounding base stations. Existing systems "know" about their neighbors because the information may be programmed in at start-up and changed from time to time manually. The standard, however, does not specify how this knowledge is to be obtained. There can be situations where the base station which is attempting to make a handoff does not have the latest information on the surrounding base stations, thus causing, at least temporarily, some confusion which can result in a less than perfect handoff.

Further, problems exist in that even when a base station knows that a neighbor is present, it does not necessarily know the current status of the neighbor nor does it necessarily know the protocol, such as the modulation scheme, or the preferred frequencies or sub-frequencies, etc., that are currently being used. Knowing the latest protocol increases the efficiency of the attempted handoff.

BRIEF SUMMARY OF THE INVENTION

The present invention is directed to a system and method which base stations send informational messages to neighbor base stations when conditions change, so that the neighbor base stations can update its database to keep itself current on the parameters (including availability, traffic load, modulation scheme, etc.) to use in effecting efficient base station to base station handoffs. In one embodiment, the receiving base station marks the time of the received message from a neighbor base station and if a new updated message is not received within a time window then the receiving base station assumes that there is a problem with that neighbor.

In some embodiments, different messages go to different neighbors setting handoff parameters that are different for each. Also, in some embodiments, the time frame for a next message can be contained in the message that is sent.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
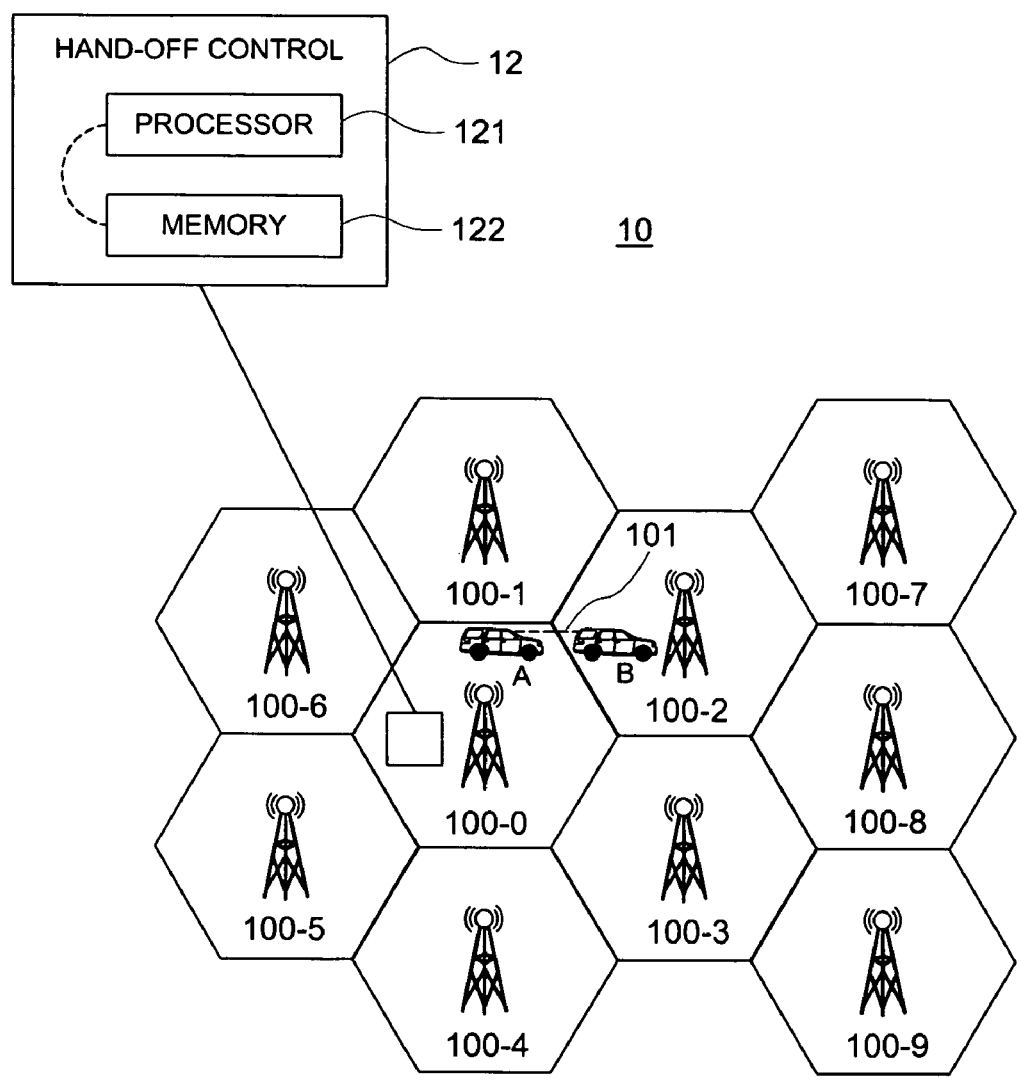
FIG. 1 shows one embodiment of a wireless system having a plurality of spaced-apart base stations.

FIG. 1 shows one embodiment of a wireless system 10 having a plurality of spaced-apart base stations 100-0 to 100-9. Note that while ten base stations are shown, the concepts discussed herein will work for any number of base stations. Mobile devices, such as mobile device 101, move through the network and from time to time they must be handed from one wireless transmission point to another. Typically, these handoffs occur because the mobile device moves out of the range of the transmission point, but sometimes handoffs are required because of capacity or other problems in the base station or at the transmission point.

When these transmission points are served from the same base station, the base station "knows" all of the necessary parameters (such as, for example, modulation scheme) and the handoff from transmission point to transmission point is seamless. However, when handoffs are required between a transmission point of one base station (the serving base station) and a transmission point of a neighboring base station (the target base station), the information concerning the receiving base station may not be current and thus the handoff may not be as smooth as desired.

With respect to FIG. 1 and the example to be discussed herein, it is assumed that mobile device 101 is moving from point A to point B and in doing so will require a handoff from transmission point 100-0 to transmission point 100-2 each point being served by a different base station, such as base station 12 serving transmission point 100-0. It is further assumed that the control of the handoff is from a base station either co-located with a transmission point or serving said transmission point (and perhaps other transmission points) from a remote location. Note also that the handoff control concepts discussed herein can be incorporated directly into the control structure of the existing base stations or can be a stand-alone system, such as handoff control system 12, having, for example, processor 121 and memory 122 for storing the control algorithms as well as the received handoff parameters and for controlling the reception, retrieval and use of the latest working parameters of a targeted other base station or transmission point, as will be discussed in further detail hereinafter.

Figure 2:
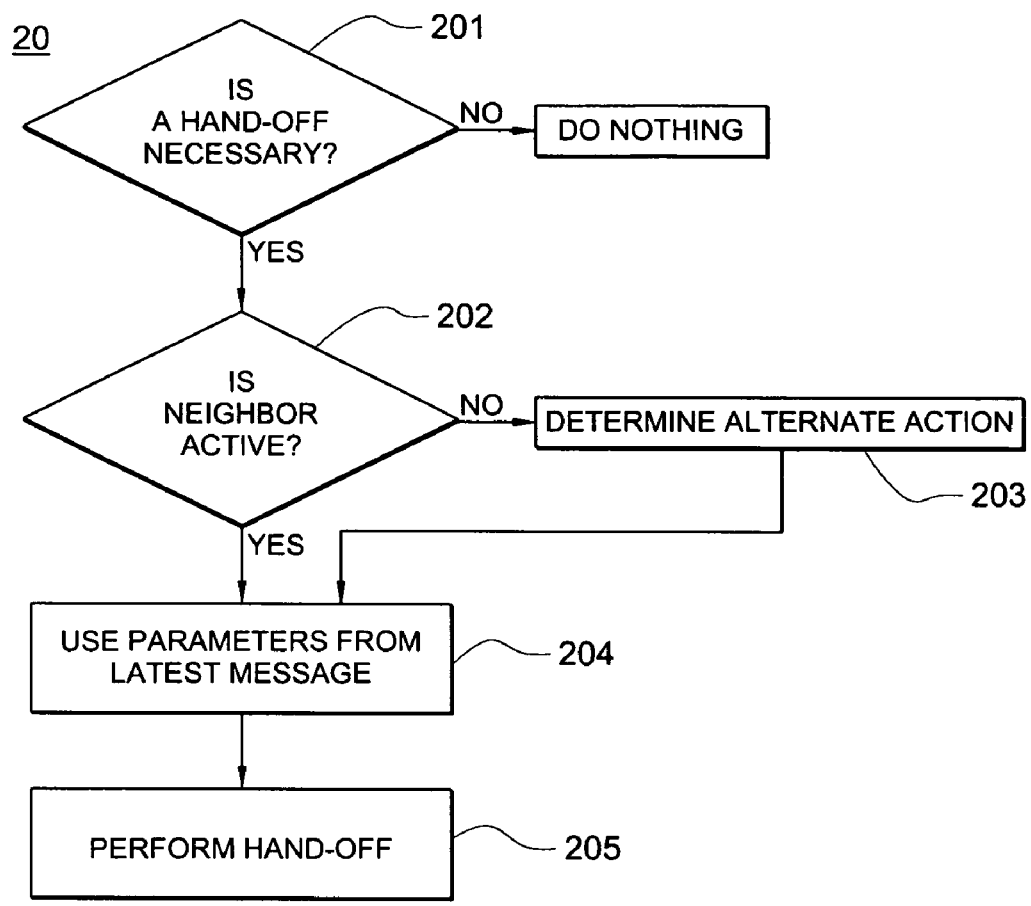
FIGS. 2, 3 and 4 show embodiments of a flow chart of system operation.

FIG. 2 shows one embodiment 20 of a flow chart of system operation with respect to the management of the active and inactive status of a particular base station. Process 201 determines if a handoff is necessary. If it is, then based on a previously established knowledge of which station would be the preferred station (target) to hand this user off to. This determination is made assuming all other factors are equal and does not take into account the latest information on the target station.

Process 202 then searches its database for the current status (active or inactive) of the target station. The active/inactive status will be discussed hereinafter but suffice to say that when a neighbor station is given the inactive flag condition it can be supposed that the parameters for that station currently on file at the serving base station are compromised in some manner. This compromise can be that the station is temporarily out of service, over-crowded with traffic, has a processing glitch causing excessive delays, or the like. If the target is inactive (i.e., the parameters associated with that station are not currently valid for use) then process 203 determines, based on criteria established by the serving station what the next course of action is to be. For example, a secondary target station can be selected, or the call can be dropped, or an attempt can be made to handoff to the original target or a message may be delivered to the user informing the user of the problem.

If the target is active, then process 204 uses the latest stored parameters, as contained in the last message received from the target station, and begins the handoff based on the parameters that have been recently provided to the serving station as shown by process 205. Note that since the latest parameters can and will change from time to time, they can easily then be made to suit the current traffic conditions of the target station and also can be tailored for different neighboring stations individually.

Figure 3:
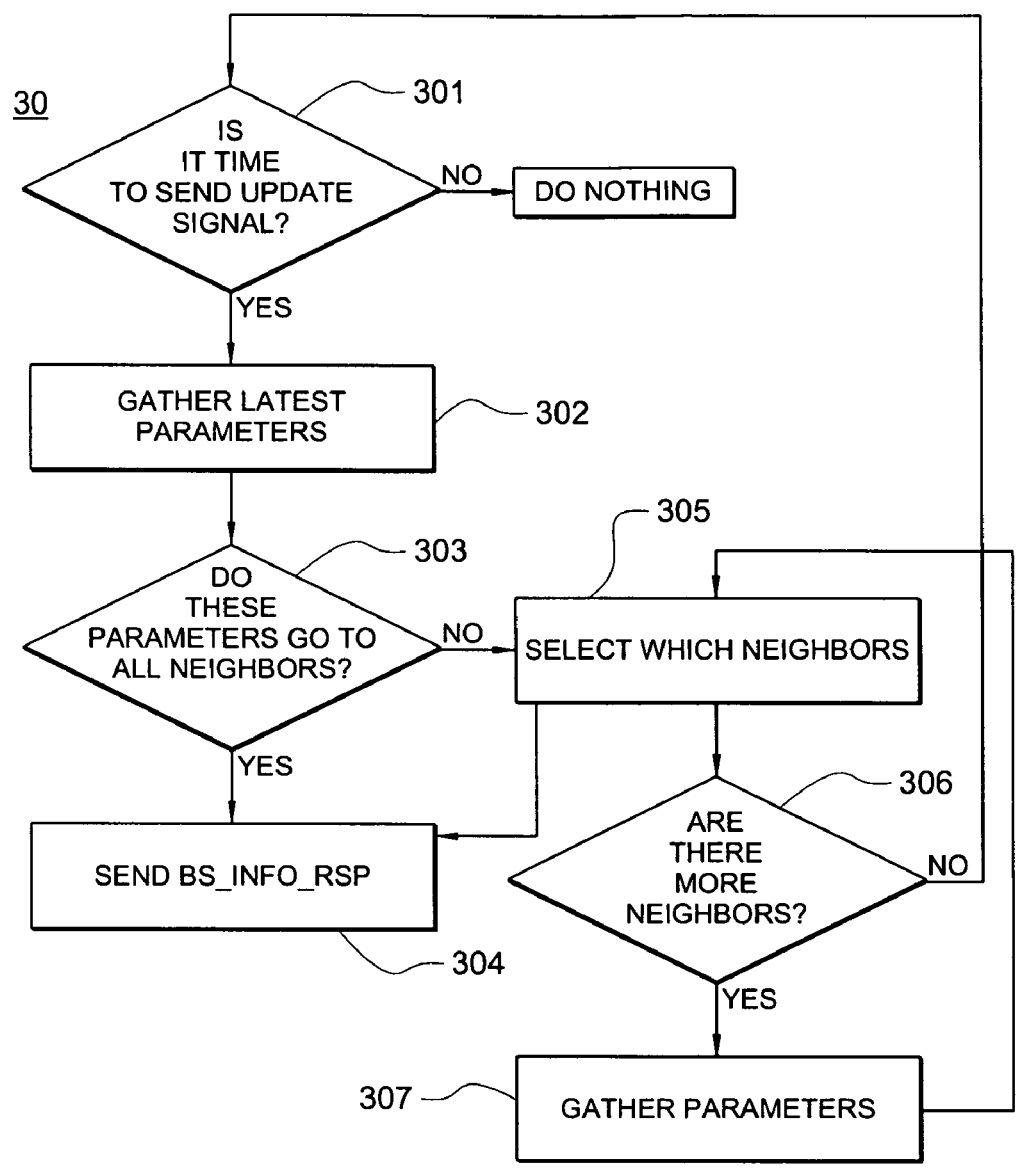

FIG. 3 shows one embodiment 30 of a flow chart of system operation with respect to the management of the current working parameters of a station. These parameters can include anything about the station, including, for example, current traffic occupancy, preferred frequencies, modulation schemes, and the like.

Process 301 determines when it is time to send an updated set of working parameters and in response thereto process 302 gathers the latest parameters (or if desired just the parameters that have changed from the last transmission) and prepares them in a message for delivery to at least one neighbor station.

Process 303 determines if these parameters are for all neighbor base stations or only for selected ones. Processes 305, 306 and 307 control the situation where different parameters go to different base stations.

Process 304 sends the parameters, for example in the form of BS_INFO_RSP. This can be sent by user datagram protocol (UDP). This information can contain any number of parameters, including Downlink Channel Description (DCD) and Uplink Channel Description (UCD) informational changes, and hand-off (HO) optimization information. This transmission can be accomplished preferably over a back channel that interconnects base stations. The back channel, or backbone network, interconnects base stations via a wired or wireless communication link, typically including a dedicated communication link.

The information that is sent can include, if desired, the time of the next message so that the receiving station knows exactly when to expect a communication. As will be discussed, if the communication does not come at that time (or if there is not a set time, then after a certain interval) the station is marked inactive.

Figure 4:
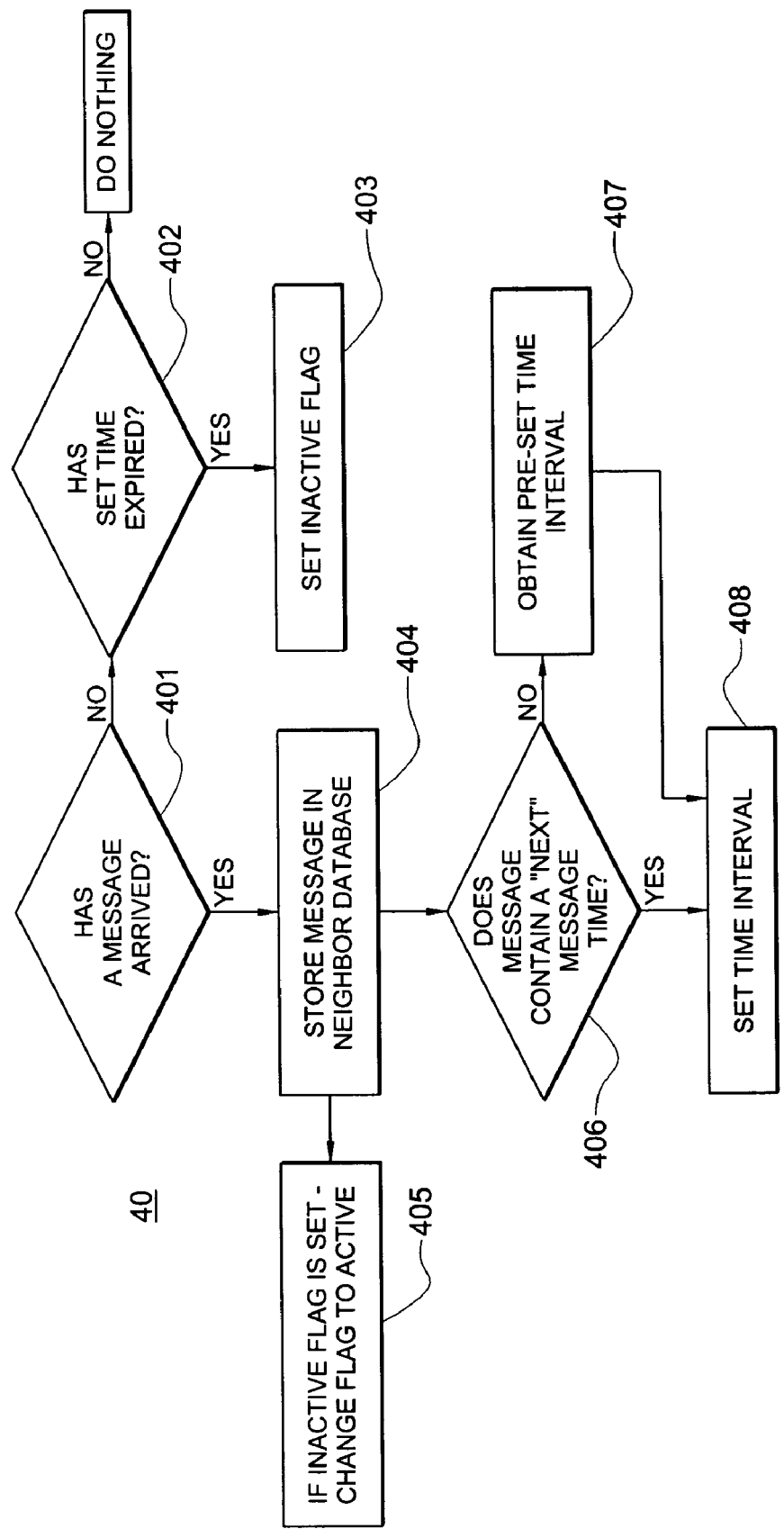

FIG. 4 shows one embodiment 40 of a flow chart of system operation with respect to the management of messages that arrive at a base station from a neighbor station. Process 401 determines if a message has arrived. Concurrently, process 402 is determining if the set time has expired. This set time can be a certain time as measured from the last received message (for example, 30 minutes) or it could be a time established in the last message, as discussed above. If the set time has expired, then process 403 sets the inactive flag.

When a message has arrived, that message is stored in a database under control of process 404 and if an inactive flag had been set, the flag is now set for active via process 405. If the flag for a neighbor base station goes from inactive to active, the serving base station collects information contained in the messages, and broadcasts the updated information concerning neighbor base stations. Process 406 determines if the message contains a time for the next update and if it does, that time is set by process 408. However, if a preset time is to be used by process 402, then process 407 establishes that time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing handoff in a wireless network, said method comprising:

receiving, at a base station, from time to time, a set of handoff parameters from neighboring transmission points;

determining, at said base station, if a handoff is necessary from a serving transmission point;

selecting, at said base station, a target transmission point from one of said neighboring transmission points;

based on said selected target transmission point, determining if the latest received handoff parameters are still valid for use; and inhibiting the use of a set of received parameters when said received parameters for one of said transmission points are deemed invalid for use.

2. The method of claim 1 further comprising:

controlling, at said base station, the handoff to said target transmission point in accordance with valid received parameters.

3. The method of claim 2 wherein said determining if the latest received handoff parameters are still valid for use comprises:

determining from time to time the validity of previously received ones of said handoff parameters for neighbor transmission points.

4. The method of claim 3 wherein said determining from time to time the validity of previously received ones of said handoff parameters for neighbor transmission points comprises:
setting a non-valid flag when updated handoff parameters have not been received within an established time limit.

5. The method of claim 4 wherein said time limits are contained within received ones of said updated parameters on a transmission point by transmission point basis.

6. The method of claim 1 wherein said receiving is at said serving transmission point.

7. The method of claim 6 wherein said handoff parameters comprises any of the parameters selected from the list of:
modulation schemes, preferred frequencies, traffic handling capacity, handover trigger conditions, channel coding types, and maximum received power.

8. A system for controlling handoff of a wireless mobile device from a serving base station to a target base station in a wireless network, said system comprising:
means in at least one base station for storing handoff parameters from possible handoff target base stations;
means in said at least one base station for determining if a handoff is appropriate to one of said target base stations;
means in said at least one base station for using said stored handoff parameters for a selected one of said target base stations in order to control a handoff to said selected target base station; and
means for inhibiting the use of a stored set of parameters when said stored parameters for said selected target base station are deemed inactive.

9. The system of 8 wherein said inhibiting means comprises:
means for changing the status of a base station from active to inactive based, at least in part, on the elapsed time from the time of storing of updated parameters pertaining to said target base station.

10. The method of claim 9 further comprising:
means for controlling said handoff to an active selected target base station in accordance with retrieved ones of said handoff parameters pertaining to said selected target base station.

11. The system of claim 10 wherein said updated handoff parameters are communicated from each of said possible target base stations to said at least one base station.

12. The system of claim 8 further comprising:
means for communicating from time to time from said at least one base station to each possible target base station the latest handoff parameters of said at least one base station.

13. The system of claim 12 wherein said parameter communication is on a back-bone network between said base stations.

14. The system of claim 13 wherein said handoff parameters are selected from the list of:
modulation schemes, preferred frequencies, traffic handling capacity, handover trigger conditions, channel coding types, and maximum received power.

15. A non-trasitory computer readable medium comprising: a computer software product operable with respect to a specific base station for controlling certain aspects of a wireless communication system, said computer product operable for:
controlling, at said specific base station, the receipt of updated working parameters of certain other base stations;
storing, at said specific base station, said received updated working parameters;
determining, at said specific base station, if a handoff is appropriate from one of said other base stations; and
determining, at said specific base station, based on the elapsed time between received ones of said updated working parameters, the active or inactive status of a particular other base station; and
inhibiting, at said specific base station, the use of stored working parameters for said particular other base station when said particular other base station is determined inactive.

16. The computer software product of claim 15 further operable for:
modifying the handoff to a specific targeted base station, depending upon the active/inactive status of said specific base station at the time of a possible handoff to said specific base station.

17. The computer software product of claim 16 further operable for:
sending, from time to time, the current working parameters of said specific base station to a list of other base stations.

18. The computer software product of claim 17 wherein said sending is over a communication path different from said wireless network.

19. The computer software product of claim 16 wherein said modifying comprises:
selecting an active base station.

20. The computer software product of claim 15 further operable for:
providing said stored working parameters for controlling a handoff to a targeted one of said base stations.

* * * * *

UNITED STATES PATENT AND TRADEMARK OFFICE
CERTIFICATE OF CORRECTION

PATENT NO.         : 8,036,173 B2
APPLICATION NO.    : 11/651307
DATED              : October 11, 2011
INVENTOR(S)        : Cheng Zhang et al.

It is certified that error appears in the above-identified patent and that said Letters Patent is hereby corrected as shown below:

Column 6, Claim 15, Line 9, delete the portion of text reading "non-trasitory" and replace with --non-transitory--.

Signed and Sealed this
Twenty-second Day of November, 2011

David J. Kappos
*Director of the United States Patent and Trademark Office*